No. 756,186. PATENTED MAR. 29, 1904.
J. H. STEWART.
COTTON CHOPPER AND WEEDER.
APPLICATION FILED DEC. 31, 1902.
NO MODEL. 3 SHEETS—SHEET 1.
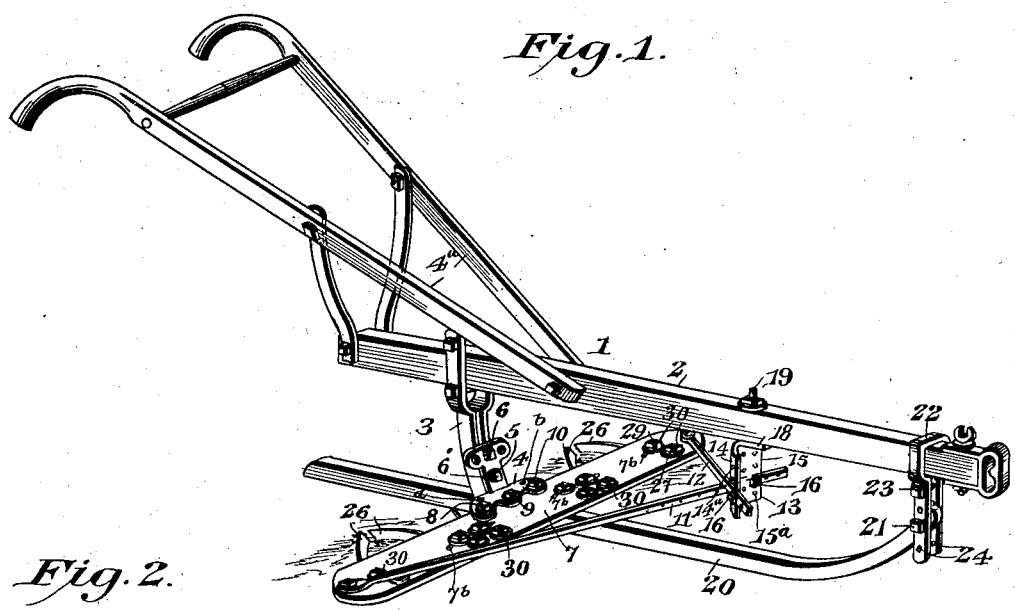
Fig. 1.
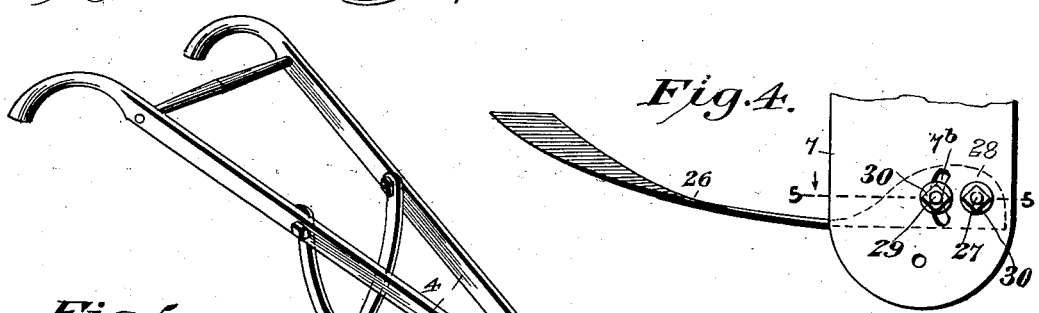
Fig. 2.
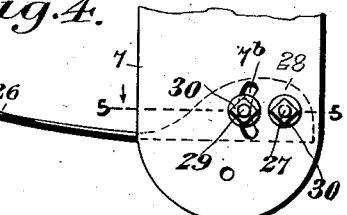
Fig. 4.
Fig. 5.
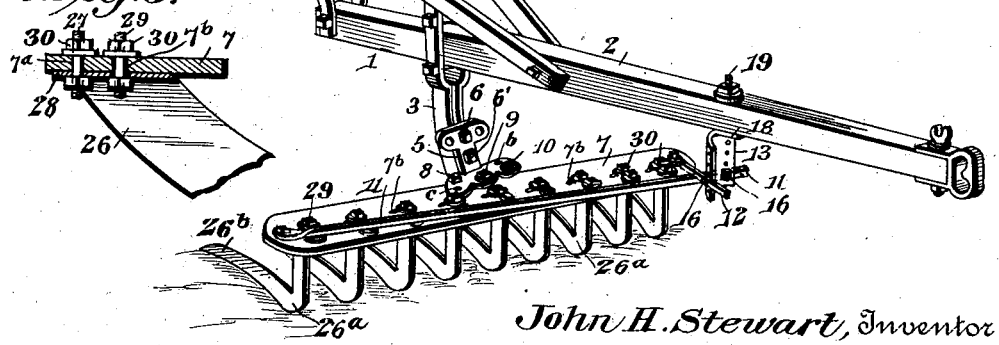
John H. Stewart, Inventor
Witnesses
Jas. K. McCathran
Louis G. Julihn
By E. G. Siggers
Attorney
THE NORRIS PETERS CO., PHOTO-LITHO., WASHINGTON, D. C.

No. 756,186. PATENTED MAR. 29, 1904.
J. H. STEWART.
COTTON CHOPPER AND WEEDER.
APPLICATION FILED DEC. 31, 1902.
NO MODEL. 3 SHEETS—SHEET 2.
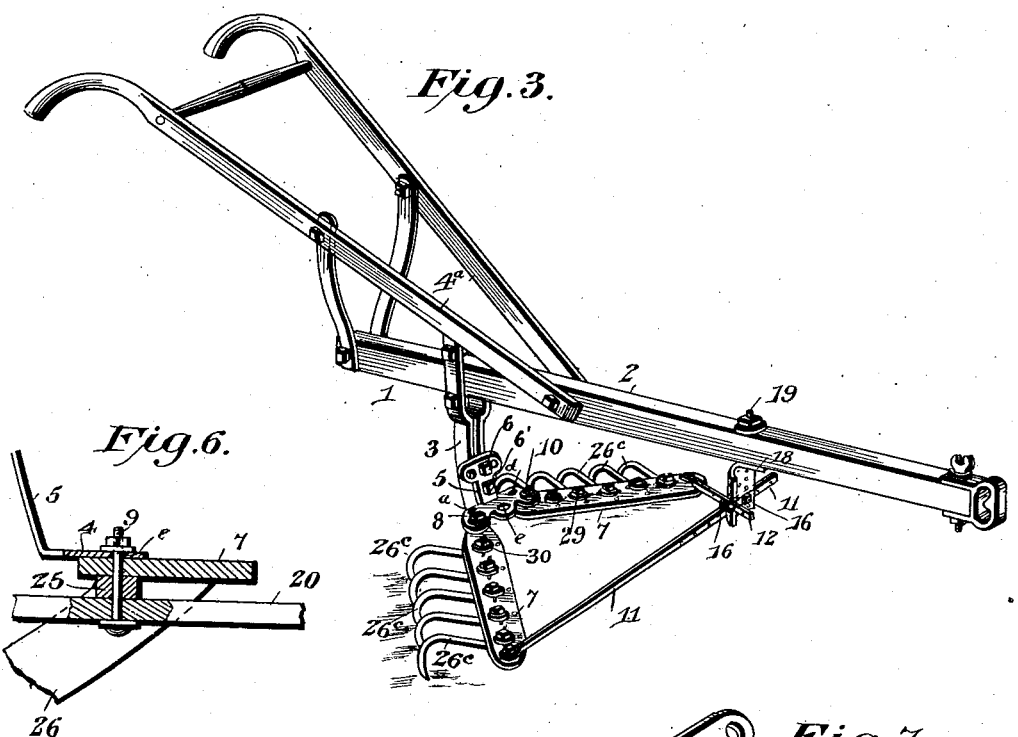
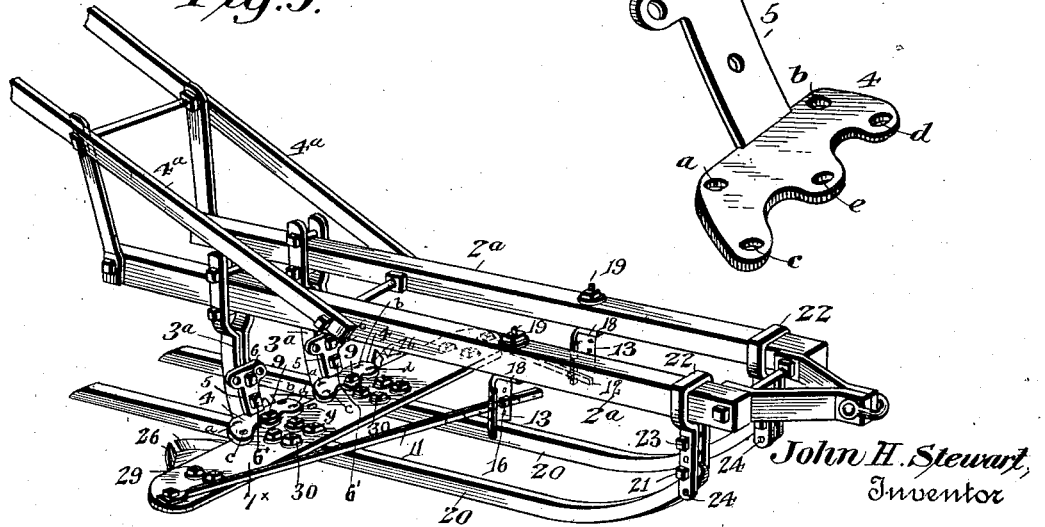

No. 756,186. PATENTED MAR. 29, 1904.
J. H. STEWART.
COTTON CHOPPER AND WEEDER.
APPLICATION FILED DEC. 31, 1902.
NO MODEL.
3 SHEETS—SHEET 3.
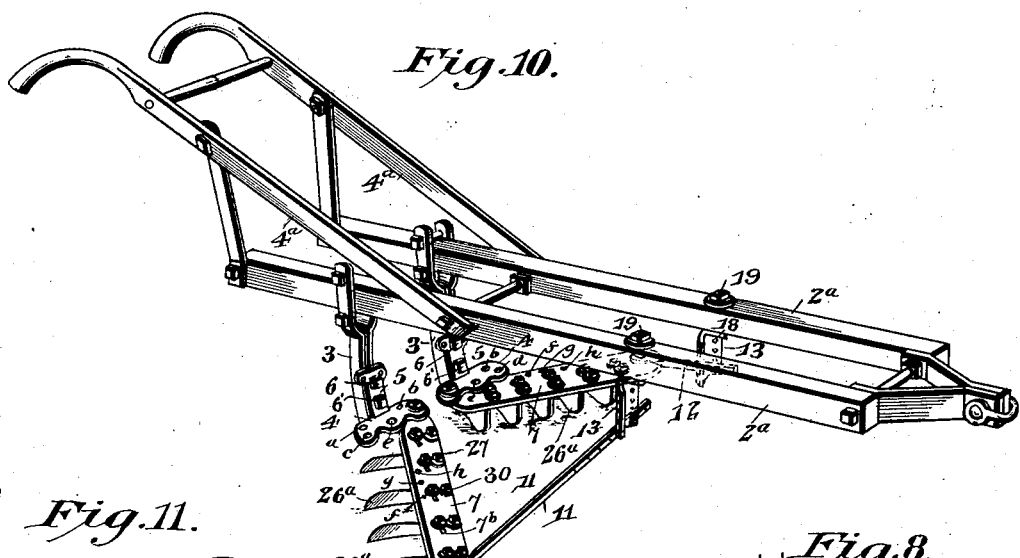
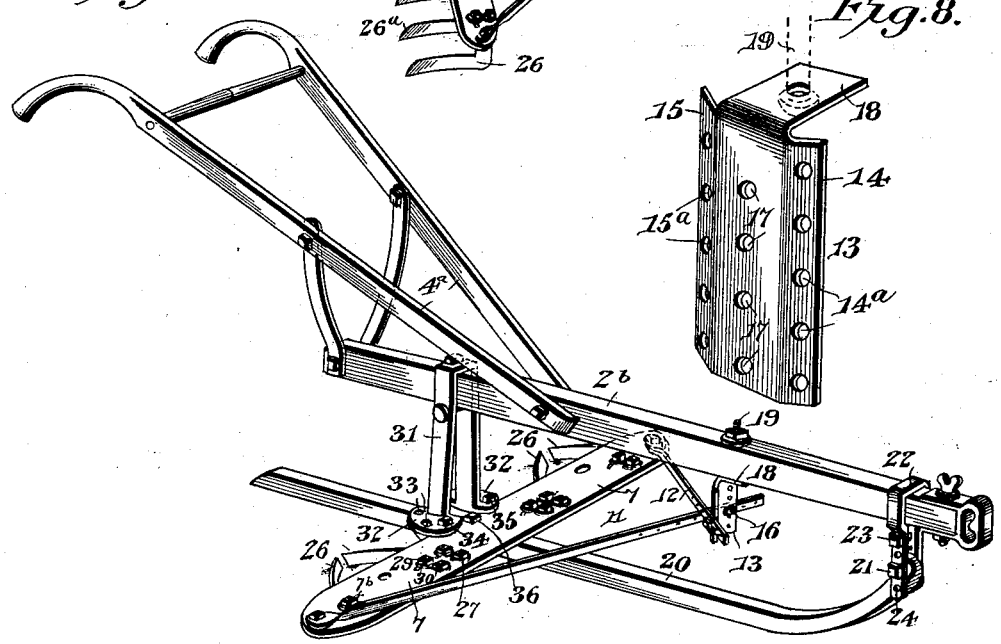
John H. Stewart Inventor No. 756,186.

Patented March 29, 1904.

UNITED STATES PATENT OFFICE.

JOHN HANIBAL STEWART, OF NAVASOTA, TEXAS.

COTTON-CHOPPER AND WEEDER.

SPECIFICATION forming part of Letters Patent No. 756,186, dated March 29, 1904.

Application filed December 31, 1902. Serial No. 137,343. (No model.)

*To all whom it may concern:*

Be it known that I, JOHN HANIBAL STEWART, a citizen of the United States, residing at Navasota, in the county of Grimes and State of Texas, have invented a new and useful Cotton-Chopper and Weeder, of which the following is a specification.

This invention relates to a novel cotton-chopper and weeder, and has for its object to produce an inexpensive implement which, while primarily designed for use as a cotton-chopper, may be quickly converted for use as a cultivator, weeder, or pulverizer, so that a single implement may be utilized by a simple rearrangement of its parts for those various operations necessary for the care and cultivation of a cotton-crop from the time the plants show above the ground until the cotton is ready for picking.

To the accomplishment of this general object the invention comprehends the equipment of a single or double beam plow with one or a pair of toe-pieces of novel construction designed for the attachment of one or more gang-bars capable of being disposed at various angles with respect to the line of draft and carrying gangs of blades or teeth adapted for various uses—that is to say, for the chopping or thinning of the cotton, the weeding of the crop, or the working of the ground.

The invention also comprehends the employment of a novel arrangement of braces for retaining the gang bar or bars at the desired angle and a novel provision in the form of a runner or runners disposed below the beam or beams of the plow to facilitate the movement of the implement crosswise of the furrows when utilized as a cotton-chopper.

Other objects of the invention subordinate to that stated and various novel features of construction and arrangement will appear during the course of the succeeding description of the illustrated embodiment of the invention.

In the accompanying drawings, Figure 1 is a perspective view of a cotton-chopper constructed in accordance with my invention. Fig. 2 is a perspective view of the device organized as a weeder. Fig. 3 is a similar view illustrating the use of two gang-bars equipped with weeding and pulverizing teeth or blades. Fig. 4 is a detail plan view of a portion of the gang-bar and a chopper-blade and designed to illustrate the manner in which the blade is adjusted with respect to the bar. Fig. 5 is a detail sectional view on the line 5 5 of Fig. 4. Fig. 6 is a detail sectional view showing the manner of connecting the toe-piece, the gang-bar, and the runner. Fig. 7 is a detail perspective view of the toe-piece detached. Fig. 8 is a detail perspective view of the drop-bracket for the attachment of the braces. Fig. 9 is a perspective view of a cotton-chopper involving a double plow-stock and a duplication of certain of the parts shown in Fig. 1. Fig. 10 is a perspective view of the double form of the device arranged as a weeder, and Fig. 11 is a modified form of cotton-chopper involving a somewhat different construction of standard.

Like characters of reference are employed to designate corresponding parts throughout the several views.

Referring more particularly to the construction illustrated in the first eight figures of the drawings, 1 indicates a plow-stock comprising, as usual, a beam 2, a standard or post 3, and handles $4^a$, this form of stock being preferably employed by reason of its simple, inexpensive, and durable construction. At the lower end of the standard 3 is secured what may be termed a "toe-piece" 4, disposed horizontally and provided with a shank 5, upstanding from its rear edge midway of its ends and rigidly secured against the side of the standard 3 by any suitable securing means—as, for instance, bolts 6 and 6'. The bolt 6' passes through the shank about midway of its ends and constitutes a fulcrum from which the toe-piece may swing, and the bolt 6 is passed through either one of a series of apertures at the upper end of the shank to secure it in its adjusted positions. The toe-piece 4 constitutes one of the novel features of the invention and is equipped with bolt-holes $a$ and $b$ at its rear corners and with similar holes $c$ and $d$ at its front corners, a fifth hole $e$ being provided midway between the holes $c$ and $d$, as shown in Fig. 7. The toe-piece is especially designed to facilitate the attachment to the plow-stock of a gang-bar 7, which carries a gang of blades or teeth constructed and arranged with special reference to the particular character of work to be done. Adjacent to its rear edge and midway between its ends the gang-bar is provided with bolt-holes $f$, $g$, and $h$, which in that organization of parts shown in Fig. 1 are disposed in coincidence with the holes $c$, $e$, and $d$ of the toe-piece for the reception of bolts 8, 9, and 10, rigidly connecting the gang-bar to the under side of the toe-piece. When secured to the toe-piece in this manner, the gang-bar will be disposed at a right angle to the line of draft and its extremities will be braced by a pair of diagonal braces 11 and 12, bolted at their rear ends to the extremities of the bar and secured at their front ends to a drop-bracket 13, secured to and depending from the beam at an advanced point. The drop-bracket is in the form of a vertically-disposed plate having its opposite side portions 14 and 15 bent into angular relation and equipped with vertical series of holes $14^a$ and $15^a$ for the reception of the securing-bolts 16 of the braces. The purpose of having the sides of the drop-bracket disposed angularly is to permit the angularly-related braces 11 and 12 to be bolted flat against the face of the bracket, as shown. In addition to the holes $14^a$ and $15^a$ the bracket is provided with a vertical series of holes 17, extending down its center, and at its upper end is provided with a horizontally-disposed lug 18, resting flat against the under side of the beam 2 and rigidly secured thereto by a bolt 19, as shown.

It is of course understood by those skilled in the art that cotton is sowed closely for the purpose of securing a good stand and is thereafter chopped or thinned. Since that organization of my implement shown in Fig. 1 is intended for use as a cotton-chopper, it is desirable to provide some means which will facilitate the progress of the device across the field in a direction transverse to the rows of cotton. I therefore provide a runner 20, which is preferably at least as long as the beam 2. The front extremity of the runner 20 is turned up, as shown in Fig. 1, and is secured by a bolt 21 between the opposite legs of a U-shaped runner bracket or clip 22, fitted upon the beam 2 adjacent to its front end and retained by a clamping-bolt 23, passed through the legs of the clip immediately below the beam. To provide for more or less vertical adjustment of the runner, the legs of the runner bracket or clip 22 are provided with coincident vertical series of openings 24, through any pair of which the runner-securing bolt 21 may be passed. The runner 20 passes back under the center of the gang-bar and is rigidly retained by the bolt 9, which passes through the toe-piece 4, the gang-bar 7, and the runner 20, as shown in Fig. 6, a spacing washer or block 25 being preferably interposed between the gang-bar and runner for the purpose of securing the desired elevation of the bar. It will be evident that when the implement is drawn across the field crosswise of the furrows the runner extending over two or more hills or ridges will support the gang-bar in proper position to present the chopping-blades to the cotton-plants without permitting them to drop down into the furrows as they pass from one row of cotton to another. To the gang-bar 7 is secured a group or gang of cotton-chopping blades or teeth 26, arranged in pairs, as shown in Fig. 1. These blades extend downwardly and rearwardly from the gang-bar, and the rear ends of the blades are curved toward each other and slightly twisted, so that the plants received between the blades of each pair thus related will be chopped out, leaving standing such plants as pass between the adjacent pairs of blades. It is desirable to provide for more or less individual adjustment of each of the blades irrespective of the particular character thereof. I have therefore provided the gang-bar 7 with a series of openings $7^a$ adjacent to its front edge and with a series of arcuate slots $7^b$, each of which is disposed in rear of and concentric with an opening $7^a$. Each of the openings $7^a$ is designed to receive a pivot-bolt 27, passing through a horizontal flange 28, projecting laterally from the upper edge of the subjacent tooth, at the front end thereof, and imposed against the under side of the gang-bar. (See Figs. 4 and 5.) The flange 28 is pierced at a point in rear of the pivot-bolt 27 with an adjusting-bolt 29, received within one of the arcuate slots $7^b$ in the gang-bar and provided at its upper end with a nut 30, which is screwed down on the bolt to securely clamp and retain the flange 28 after the tooth has been properly adjusted in a lateral direction from an axis defined by the pivot-bolt 27.

The construction as thus far described constitutes a complete embodiment of my invention in one aspect thereof; but, as I have heretofore stated, I contemplate a reorganization or conversion of the implement for the purpose of adapting it for various uses in connection with the cultivation of a crop of cotton. For instance, as shown in Fig. 2, the device may be quickly converted for use as a weeder. This embodiment of the invention contemplates the omission of the runner 20 and its supporting-clip, the attachment of the gang-bar at an oblique angle to the line of draft, and the equipment of the gang-bar with a gang of blades differing somewhat in form and arrangement from the cotton-chopping blades shown in Fig. 1. The gang-bar 7 instead of being secured to the foot-piece by bolts passed through the openings $c$, $e$, and $d$ of the toe-piece and $f$, $g$, and $h$ of the bar are disposed at such an angle that the openings $f$ and $g$ in the bar are brought into coincidence with the openings $a$ and $e$ in the toe-piece and are secured by bolts passing through said openings, as shown in Fig. 2. The braces 11 and 12 are employed as in the first-described arrangement and are of course adjustable to accommodate the oblique angular arrangement of the gang-bar. The weeder-teeth $26^a$ are adjustably secured to the gang-bar in a manner identical with the attachment of the cotton-chopping blades 26 heretofore described; but, unlike said blades, they are arranged in regular series instead of in pairs. These weeder-blades $26^a$ are of angular form and are disposed with their rearwardly-extending colter ends $26^b$ inclined at an angle of thirty degrees or more to the line of draft.

In Fig. 3 still another arrangement of the implement is shown. This form, which is designed with special reference to the simultaneous weeding and pulverizing of the ground, comprehends the employment of a pair of gang-bars 7, diverging from the opposite ends of the toe-piece and secured by the bolts 8 and 10, passed through the openings $c$ and $d$ of the toe-piece and through terminal openings in the gang-bars. The outer ends of the bars are held rigidly by the braces 11 and 12, arranged as heretofore described. Aside from the somewhat different arrangement of the gang-bars with respect to the toe-piece this form of the invention differs from that shown in Figs. 1 and 2 in that it comprehends the employment of curved rearwardly-extending weeder-teeth $26^c$, designed for individual lateral adjustment in a manner similar to that already pointed out.

Aside from these several forms of the invention shown in Figs. 1, 2, and 3 I also contemplate under some conditions the use of a double plow-stock, as shown in Figs. 9 and 10. Stocks of this character embody a pair of beams $2^a$, provided with standards $3^a$ (each of which is equipped with one of my toe-pieces) and also with drop-brackets 13. When the double stock is utilized in connection with my invention organized as a cotton-chopper, as shown in Fig. 9, a gang-bar $7^\times$, which may or may not be longer than that shown in Fig. 1, is secured to both of the toe-pieces by the bolts 9, passed through the openings $e$ in the toe-pieces and through the openings $f$ and $h$ in the gang-bar. The braces 11 and 12 are each extended from one of the drop-brackets 13 to the adjacent end of the gang-bar, and below each beam is disposed a runner 20, secured by the bolt 9 and connected at its front end with a runner bracket or clip 22, mounted on the adjacent beam $2^a$. This organization of parts is precisely like that shown in Fig. 1, with the exception that the stock is of double form and the toe-pieces, runners, drop-brackets, and runner-clips are duplicated. Generally the cotton-chopper arranged as shown in Fig. 1 is preferable; but the form shown in Fig. 9 may be desirable, particularly where a gang-bar of considerable length can be economically employed.

Fig. 10 shows the parts of the implement organized in a manner similar to that shown in Fig. 3, the difference being that the double form of stock is employed and that the two gang-bars instead of extending from the opposite ends of a single toe-piece are bolted to the adjacent ends of a pair of toe-pieces and instead of being equipped with the teeth shown in Fig. 3 are provided with the weeder-blades shown in said figure. This form differs, further, from Fig. 3 in that the braces instead of extending from the outer ends of the gang-bars to a single drop-bracket are connected to separate drop-brackets in a manner similar to the arrangement of the braces in Fig. 9.

In Fig. 11 I have illustrated a single form of cotton-chopper, which differs from Fig. 1 in that the toe-piece and standard shown therein are substituted by an inverted-U-shaped yoke 31, straddling the beam $2^b$ and provided with horizontally-disposed toe-plates 32 at the lower ends of its legs. Each of the plates 32 is provided with a series of bolt-openings 33 for the reception of bolts 34 and 35, which pass through the bolt-holes $f$ and $h$ of the gang-bar. By this arrangement the gang-bar may be set at any desired angle with respect to the line of draft, and when the runner is employed it will be secured to the gang-bar by a bolt 36, passed through the opening $g$ in the bar. Where this yoke 31 is utilized in place of the standard and toe-piece, separate gang-bars may be secured at their inner ends to the toe-plates 32, just as the gang-bars are attached to the toe-pieces of Fig. 10. While this variation has not been illustrated, it will be seen that the device shown in Fig. 11 might be readily employed as a double-row cultivator.

It is thought that from the foregoing the construction and operation of my cotton-chopper and weeder will be clearly apparent; but, while the illustrated embodiment of the invention is believed at this time to be preferable I do not wish to limit myself to the structural details defined, as, on the contrary, I reserve the right to effect such changes, modifications, and variations of the illustrated structure as may be fairly embraced within the scope of the protection prayed.

What I claim is—

1. In an implement of the character described, the combination with a stock including a beam and standard, of a gang-bar secured at the lower end of the standard and provided with a gang of blades, and adjustable means including a plurality of spaced devices for securing the gang-bar to the lower end of the standard in different angular positions with respect to the line of draft.

2. In an implement of the character described, the combination with a stock including a beam and standard, of a horizontal toe-piece at the lower end of the standard, a gang-bar provided with a gang of blades, and means including a plurality of spaced devices for adjustably securing the gang-bar to the toe-piece in various angular positions with respect to the line of draft.

3. In an implement of the character described, the combination with a stock including a beam and standard, of a horizontal toe-piece carried at the lower end of the standard and having a series of bolt-openings, of a gang-bar disposed across the line of draft and imposed against the under side of the toe-piece, a gang of blades depending from the gang-bar, and bolts passed through the gang-bar and through certain of the openings in the toe-piece.

4. In an implement of the character described, the combination with a stock including a beam and standard, of a gang-bar carried at the lower end of the standard and provided with a gang of blades, and a runner disposed below the gang-bar to maintain the proper position of the latter.

5. In an implement of the character described, the combination with a stock including a beam and standard, of a gang-bar carried thereby at the lower end of the standard and provided with a gang of blades, and a runner secured to the beam in advance of the gang-bar and extended under and in rear of said gang-bar to sustain the latter.

6. In an implement of the character described, the combination with a stock including a beam and standard, of a gang-bar secured at the lower end of the standard and provided with a gang of blades, a runner disposed below the beam and extended under the gang-bar, and means for securing the runner to the beam and gang-bar respectively.

7. In an implement of the character described, the combination with a stock including a beam and standard, of a toe-piece secured at the lower end of the standard, a gang-bar secured to the toe-piece and disposed across the line of draft, a gang of blades depending from the gang-bar, and a runner disposed in the line of draft and connected to the gang-bar and beam respectively.

8. In an implement of the character described, the combination with a stock including a beam and standard, of a toe-piece mounted at the lower end of the standard, a gang-bar disposed across the line of draft, a runner located below the beam and extended under the gang-bar, a bolt passed through the toe-piece, gang-bar and runner to secure said parts in a rigid organization, and means for attaching the front end of the runner to the beam.

9. In an implement of the character described, the combination with a stock including a beam and standard, of a gang-bar disposed across the line of draft and located at the lower end of the standard, a drop-bracket and a runner-bracket carried by the beam, braces extending from the opposite ends of the gang-bar to the drop-bracket, and a runner secured at its front end to the runner-bracket and extended rearwardly under the gang-bar.

10. In an implement of the character described, the combination with a stock including a beam and standard, of a horizontal toe-piece secured to the lower end of the standard, a gang-bar secured to the toe-piece and disposed across the line of draft, a gang of blades carried by the bar, a drop-bracket and a runner-bracket depending from the beam in advance of the gang-bar, diagonal braces secured to the opposite ends of the gang-bar and to the drop-bracket respectively, a runner having an upturned front end secured to the runner-bracket, and means for rigidly securing the runner to the gang-bar.

11. In an implement of the character described, the combination with a stock, of a gang-bar carried by the stock and provided with a gang of blades arranged in pairs, the blades of each pair having their rear ends deflected toward each other, and a runner secured to the stock and extended below the gang-bar to maintain the latter in proper position.

In testimony that I claim the foregoing as my own I have hereto affixed my signature in the presence of two witnesses.

JOHN HANIBAL STEWART.

Witnesses:
   J. H. FREEMAN,
   J. T. BARRY.